Jan. 14, 1964  C. VAN DER LELY  3,117,407
IMPLEMENTS FOR LATERALLY DISPLACING CROP LYING ON THE GROUND
Filed Oct. 17, 1960
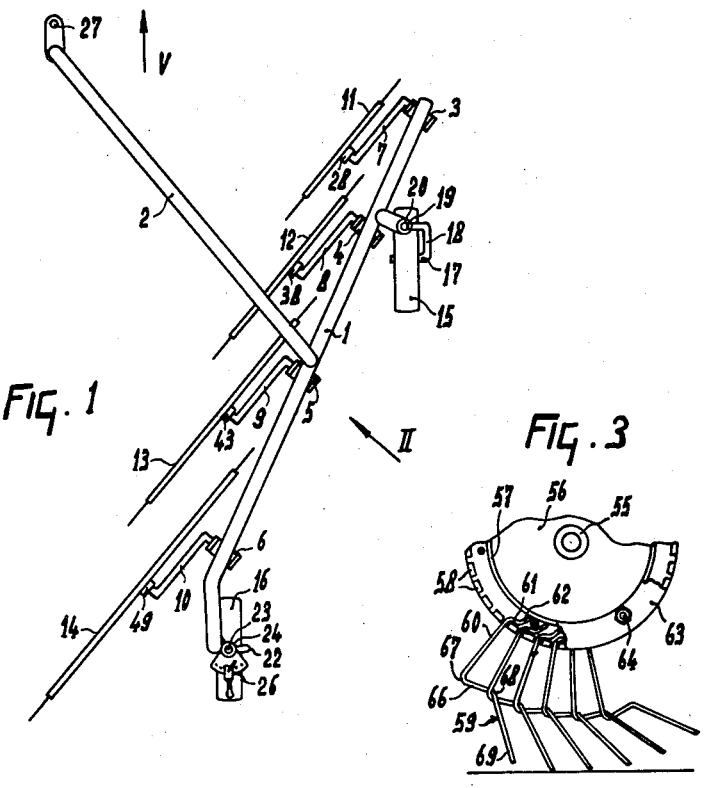
Cornelis van der Lely
INVENTOR.
BY
Mason, Mason & Albright
ATTORNEYS 3,117,407
IMPLEMENTS FOR LATERALLY DISPLACING
CROP LYING ON THE GROUND
Cornelis van der Lely, Zug, Switzerland, assignor to
C. van der Lely N.V., Maasland, Netherlands, a Dutch
limited-liability company
Filed Oct. 17, 1960, Ser. No. 63,212
Claims priority, application Netherlands Nov. 6, 1959
4 Claims. (Cl. 56—377)

This invention relates to an implement for laterally displacing crop lying on the ground, the implement being of the kind having a row of rake wheels supported by a frame, the rake wheels having peripheral tines or like crop engaging members.

According to the present invention, there is provided an implement of the kind set forth, wherein the overall diameter of a rake wheel situated between the forward and rearward rake wheels in the row, is greater than the overall diameter of a rake wheel disposed forwardly of the firstmentioned rake wheel, and is less than the overall diameter of a rake wheel disposed rearwardly of the firstmentioned rake wheel ("forwardly" and "rearwardly" being with respect to the intended direction of travel of the implement).

In referring herein to the "overall diameter" of a rake wheel, it is to be understood that this is measured between the tips of diametrically opposite tines.

For a better understanding of the invention and to show how the same may be carried into effect, reference will now be made by way of example to the accompanying drawing, in which:

FIGURE 1 is a plan of an implement for laterally displacing crop lying on the ground, FIGURE 2 is an elevation of the implement shown in FIGURE 1, as seen in the direction of the arrow II in FIGURE 1, and FIGURE 3 shows a fragmentary elevational view of a modification of part of the implement shown in FIGURES 1 and 2.

As shown in FIGURES 1 and 2, the implement has a main frame beam 1, to which is secured a draw-bar 2 having an eye 27 formed at the forward end thereof. Four bearing sleeves 3, 4, 5 and 6 are fastened to the frame beam 1, and cranks 7, 8, 9 and 10 of equal dimensions are turnably supported in the bearing sleeves. Rake wheels 11, 12, 13 and 14 are freely rotatably mounted on the free ends of the cranks. The frame of the implement is supported by two ground wheels 15 and 16 located near the ends of the frame beam 1. The ground wheel 15 is mounted on an axle 17 connected by an arm 18 with a vertical shaft 19 which is arranged to be freely turnable in a bearing sleeve 20 secured to the frame beam 1. The arrangement is such that the ground wheel 15 is a caster wheel, since the axes of the axle 17 and the shaft 19 do not intersect. The ground wheel 16 is mounted on an axle 21 connected by an arm 22 with a vertical shaft 23 which is journalled in a bearing sleeve 24 secured to an end 25 of the frame beam 1, the end 25 being bent downwardly. The axes of the axle 21 and the shaft 23 intersect, and the angular position of the ground wheel 16 with respect to the frame of the implement can be adjusted by turning the vertical shaft 23 in the bearing sleeve 24 and fixing one with respect to the other with the aid of a locking member 26 of known form as indicated in Patent No. 2,689,446, Sorrels, September 21, 1954. Thus the ground wheel 16 can operate as a direction-controlling wheel.

The rake wheel 11 includes a hub 28 which is freely rotatable about the axis of the crank pin of the crank 7. A plate 29, which constitutes the central part of the rake wheel is fastened to the hub, and tines, such as 31 and 32, are bolted to the plate 29 with the aid of bolts 30. Each pair of tines, such as the pair 31, 32, is formed from a single piece of resilient material. The rake wheel 11 has a felly 33 in which are formed holes. The tines 31 and 32 are supported in the holes and are turnable therein. The tines 31 and 32 have portions 34 and 35, respectively, located outside the circumference of the felly, these portions being inclined to portions 36 and 37, respectively, located within the circumference of the felly.

The rake wheel 12 has a hub 38 mounted on the crank pin of the crank 8, and has a central part formed by a plate 39. Tines 41 and 42 are secured to the plate 39 by bolts, and pass through holes in a felly 40. The arrangement is similar to the arrangement of the rake wheel 11, but the rake wheel 12 is of larger overall diameter since the plate 39 is larger than the plate 29.

The rake wheel 13 has a hub 43 mounted on the crank pin of the crank 9, and has a central part formed by an annulus 44 supported by spokes 45 which are secured to the hub 43. Tines 46 and 47 are secured to the annulus 44 by bolts, and pass through holes in a felly 48. Thus the arrangement is similar to the arrangement of the rake wheel 12, except that the central part is formed by the annulus and spokes, and the rake wheel 13 is of larger overall diameter than the rake wheel 12 since the annulus 44 is larger than the plate 39.

The rake wheel 14 has a hub 49 mounted on the crank pin of the crank 10 and has a central part formed by an annulus 50 supported by spokes 51 which are secured to the hub 49. Tines 52 and 53 are secured to the annulus 50 and pass through holes in a felly 54. The rake wheels 14 and 13 are similar, the rake wheel 14 being of larger overall diameter since the annulus 50 is larger than the annulus 44.

Although the rake wheels are of different overall diameters, the same kind of tine is used in each rake wheel, since the central parts of the rake wheels are of different diameters. Large rake wheels, such as the rake wheels 13 and 14, are light of weight owing to the provision of the annuli, such as 44 and 50, and are of simple construction. If desired, the annuli may be replaced by members formed from a plurality of straight portions secured together to form polygonal members upon which the tines are arranged.

The operation of the implement will now be described.

The implement is coupled to a tractor or the like with the aid of the eye 27 at the forward end of the draw-bar 2, and the implement is drawn forward over the ground in the direction indicated by the arrow V in FIGURE 1. As the implement moves over the ground, the rake wheels are rotated by virtue of their contact with the ground and/or the crop lying thereon. Each rake wheel displaces to the left (with respect to the direction V) the crop lying in its path. Thus the rake wheel 11 displaces crop to the left to lie in front of the rake wheel 12, which displaces such crop, together with crop already lying in its path, to the left to lie in front of the rake wheel 13. This displacement is repeated for the rake wheels 13 and 14, so that all the crop lying in front of the rake wheels is displaced to form a swath to the left of the rake wheel 14. As is apparent from FIGURES 1 and 2, the overall diameters of the rake wheels increase from the forward end to the rear end of the implement. Thus the implement is arranged so that the larger rake wheels engage the crop displaced by the smaller rake wheels, together with the crop already lying in their paths. Therefore a large swath can be formed without risk of jamming the rake wheels by accumulation of crop above the hubs thereof. The formation of a large swath is facilitated by the fact that the crop, as it is being displaced, tends to be rolled over by the rake wheels 11, 12 and 13, so that the displaced crop does not contact the rake wheels to its maximum height. As will be noted from FIGURE 1, the frame beam 1 of the implement is located behind the rake wheels, with respect to the direction V. Thus crop does not contact the frame beam. The frame beam 1 is disposed parallel to a line joining the centres of the rake wheels. In order to ensure adequate overlapping of the rake wheels, the distance between the bearing sleeves 3 and 4 is smaller than the distance between the bearing sleeves 4 and 5, which distance is, in turn, smaller than that between the bearing sleeves 5 and 6. Therefore, since the cranks 7, 8, 9 and 10 are of the same size, the distance between the hubs of the rake wheels 11 and 12 is smaller than the distance between the hubs of the rake wheels 12 and 13, which distance is, in turn, smaller than the distance between the hubs of the rake wheels 13 and 14. It has been found in practice that the variation of the distance between two successive rake wheels need not be proportional to the overall diameters of the rake wheels, and that such distance between two successive rake wheels may be greater than would be the case if the distance were proportional to the rake wheel diameters. Therefore, an implement may be constructed having a satisfactory operation, and having a greater working width than known implements of the same kind.

The number of different component parts required in the manufacture of the rake wheels for the implement can be also reduced by constructing the rake wheels in the form shown in FIGURE 3.

As shown in FIGURE 3, the rake wheel includes a hub 55 to which is secured a plate 56 which forms the central part of the rake wheel. The plate 56 has a circular hoop 57 secured to one side thereof at a fixed distance from the periphery, and has a series of lugs 58 arranged at the periphery of the plate. The rake wheel has tines, such as 59, each of which has a radial spoke-like portion 60. The inner end of the radial portion 60 is disposed between two adjacent lugs 58, and a portion 61 of the tine 59, adjacent the portion 60, is bent so as to bear on the radially inner face of a lug 58. The portion 61 continues as a portion 62, which is inclined to the portion 61, and the free end of the portion 62 bears on the hoop 58. By virtue of this method of securing the tines to the rake wheel, the tines are prevented from moving in the plane of the rake wheel. To prevent the tines moving in a direction at right angles to the plane of the rake wheel, an annular plate 63 is fastened to the plate 56 with the aid of bolts 64, so that the portions 61 and 62 of the tines, such as 59, are enclosed between the two plates.

The portion 60 of the tine 59 is bent at 67 to form a portion 66 which is substantially tangential to a circle centered on the hub of the rake wheel. At 68, the portion 66 is bent to form a foot portion 69 of the tine. The tines of the rake wheel are interconnected by engaging the bend 68 of one tine with the bend 67 of a further tine. Thus a satisfactory rake wheel is obtained without the necessity for a felly. Therefore, use of the embodiment of rake wheel shown in FIGURE 3 has the advantage that the four different fellies 11, 12, 13 and 14 of the first embodiment of rake wheel shown in FIGURES 1 and 2, are not required. A further advantage is that the tine portions 60 may be arranged radially whatever the diameter of the rake wheel. Larger rake wheels may have a central portion in the form of an annulus supported by spokes, as described for the rake wheels 13 and 14 of the first embodiment.

It will be appreciated that, if desired, the cranks and their rake wheels may be supported resiliently in known manner.

What I claim is:

1. An implement of the kind set forth including a frame, a plurality of rake wheels mounted in echelon on said frame, the diameter of said rake wheels being progressively greater from the forwardmost rake wheel to the rearwardmost rake wheel on said frame, with respect to the intended direction of travel of the implement.

2. An implement as claimed in claim 1, wherein the tines of each rake wheel are secured to a central portion of the respective rake wheel, the central portions being of different areas in the rake wheels of different diameters.

3. An implement as claimed in claim 2, wherein the central portion consists of an annulus secured to the hub of the rake wheel by spokes.

4. An implement as claimed in claim 2 wherein each rake wheel has a central portion, a hub and radially extending tines connected thereto, the central portions of said rake wheels being proportionately larger in the progressively larger rake wheels.

References Cited in the file of this patent

UNITED STATES PATENTS

| | | |
|---|---|---|
| 2,807,927 | Van der Lely et al. | Oct. 1, 1957 |
| 2,909,023 | Van der Lely et al. | Oct. 20, 1959 |